US 7,969,462 B2

(12) United States Patent
Ostromek et al.

(10) Patent No.: US 7,969,462 B2
(45) Date of Patent: Jun. 28, 2011

(54) DIGITALLY ENHANCED NIGHT VISION DEVICE

(75) Inventors: Timothy E. Ostromek, Richardson, TX (US); Joseph P. Estrera, Dallas, TX (US); Jeffrey C. Short, Richardson, TX (US); Lee S. May, Jr., Dallas, TX (US); Bruce V. Hoodswain, Plano, TX (US); Timothy B. Hogan, Irving, TX (US)

(73) Assignee: L-3 Communications Corporation, New York, NY (US)

( * ) Notice: Subject to any disclaimer, the term of this patent is extended or adjusted under 35 U.S.C. 154(b) by 1492 days.

(21) Appl. No.: 11/308,461

(22) Filed: Mar. 28, 2006

(65) Prior Publication Data

US 2006/0221180 A1    Oct. 5, 2006

Related U.S. Application Data

(60) Provisional application No. 60/594,337, filed on Mar. 30, 2005.

(51) Int. Cl.
H04N 9/47      (2006.01)
H04N 13/02     (2006.01)
G06K 9/36      (2006.01)
G06K 9/40      (2006.01)

(52) U.S. Cl. ............ 348/53; 348/48; 382/276; 382/254; 382/284

(58) Field of Classification Search ............ 348/53, 348/48; 382/276, 284, 254
See application file for complete search history.

(56) References Cited

U.S. PATENT DOCUMENTS

| 4,786,966 A | 11/1988 | Hanson et al. ............... 358/108 |
| 5,561,751 A | 10/1996 | Wong |
| 5,729,376 A | 3/1998 | Hall et al. ..................... 359/366 |
| 6,211,911 B1 * | 4/2001 | Komiya et al. ............ 348/218.1 |
| 6,560,029 B1 * | 5/2003 | Dobbie et al. ................ 359/631 |
| 6,593,561 B2 | 7/2003 | Bacarella et al. .......... 250/208.1 |
| 7,620,265 B1 * | 11/2009 | Wolff et al. .................... 382/276 |
| 2002/0195561 A1 * | 12/2002 | Bacarella et al. ............. 250/330 |
| 2003/0231804 A1 | 12/2003 | Bacarella et al. |
| 2005/0190990 A1 * | 9/2005 | Burt et al. ..................... 382/294 |

(Continued)

FOREIGN PATENT DOCUMENTS

JP    2003/290125 A    10/2003

(Continued)

OTHER PUBLICATIONS

C.R. Nave, Georgia State University, website, http://hyperphysics.phy-astr.gsu.edu/hbase/vision/cie.html#c1.

(Continued)

*Primary Examiner* — David L Ometz
*Assistant Examiner* — Quang V Le
(74) *Attorney, Agent, or Firm* — Marsteller & Associates, P.C.

(57) ABSTRACT

A user portable viewing device includes a plurality of non-coaxially aligned sensors for sensing a scene. A processing element combines electronic images into a single electronic image. A display displaying the combined electronic image is adaptable for mounting in an optical axis including an eye of the user and an input end of the first sensor for direct view. In a second embodiment, a system for fusing images comprises sensors for generating sets of image data. An information processor receives and samples the sets of image data to generate sample data for computing a fused image array. A display receives the fused image array and displays a fused colorized image generated from the fused image array.

12 Claims, 3 Drawing Sheets

U.S. PATENT DOCUMENTS

2007/0076917 A1* 4/2007 Chen et al. .................... 382/103
2009/0256908 A1* 10/2009 Chen et al. .................... 348/143

FOREIGN PATENT DOCUMENTS

| JP | 2003/304435 A | 10/2003 |
|---|---|---|
| JP | 2004/003878 A | 1/2004 |
| WO | WO 03/105084 A2 | 12/2003 |
| WO | WO 03/107649 A2 | 12/2003 |

OTHER PUBLICATIONS

D.A. Fay et al., article: "Fusion of Multi-Sensor Imagery for Night Vision: Color Visualization, Target Learning and Search," MIT.

M. Lukens, article: "Robust Regression and COlor Fusion," George Mason University Spring 2001.

Arnold Goldberg, article: "Dual-Band Infrared Imaging of Tactical and Strategic Targets," EO/IR Technology Branch Army Research Lab, Adelphi, MD.

M. Esin Ulug, Intelligent Neurons website, http://www.intelligentneurons.com/color4.htm.

Notice of Refusal from Japan Patent Office (JPO) in counterpart application No. 2008-504293, mailed Mar. 1, 2010.

English language translation of Notice of Refusal from Japan Patent Office (JPO) in counterpart application No. 2008-504293, mailed Mar. 1, 2010 (item 1 above).

Notice of Refusal from Japan Patent Office (JPO) in counterpart application No. 2008-504293, mailed Feb. 8, 2011.

English language translation of Notice of Refusal from Japan Patent Office (JPO) in counterpart application No. 2008-504293, mailed Feb. 8, 2011 (item 1 above).

* cited by examiner

DIGITALLY ENHANCED NIGHT VISION DEVICE

CROSS REFERENCE TO RELATED APPLICATIONS

This application claims the benefit of U.S. Provisional Application Ser. No. 60/594,337, filed Mar. 30, 2005, entitled DIGITALLY ENHANCED NIGHT VISION DEVICE.

BACKGROUND OF THE INVENTION

1. Technical Field

The invention relates to the field of imaging systems and more particularly to a method and system for fusing image data from multiple sources.

2. Background Art

Multiple sensor imaging systems generate an image of an object by fusing data that is collected using multiple sensors. Gathering image data using multiple sensors, however, has posed challenges. In some systems, the sensors detect light received from separate apertures. Data generated from light from separate apertures, however, describe different points of view of an object that need to be reconciled in order to fuse the data into a single image. Additionally, using separate apertures for different sensors may increase the bulk of an imaging system.

In other systems, light from an aperture is split into components before entering the sensors. Reflective and refractive elements are typically used to direct the light to different sensors. For example, the system described in U.S. Pat. No. 5,729,376 to Hall et al. includes multiple reflective and refractive elements such as a lens that reflects light towards one sensor and refracts light towards another sensor. Each individual sensor, however, detects only a component of light, for example, only specific wavelengths of light, and thus cannot generate image data from the full spectrum. Additionally, multiple reflective and refractive elements may add to the bulk and weight of an imaging system. Consequently, gathering image data from multiple sensors has posed challenges for the design of imaging systems.

Yet other systems electronically combine the images generated from separate sensors. Image fusion involves combining two or more images produced by two or more image sensors into one single image. Producing one image that mitigates the weak aspects of the individual images while retaining the strong ones is a complicated task, often requiring a computer or processor with substantial computing power.

Generally, the prior attempts to fuse or combine images from a plurality of sensors into a single image generated a monochrome image where the only variable in the viewed combined image was a difference in light intensity or the intensity of a single color. Such monochrome images result in the loss of information to the viewer that is otherwise obtainable from the individual sensor images.

Further, it is known that the human eye has three different types of color sensitive cones. The response of the eye is best described in terms of three "tristimulus values." However, it has been found that any color can be expressed in terms of the two color coordinates x and y.

The colors which can be matched by combining a given set of three primary colors (such as the blue, green, and red of a color television screen) are represented on a chromaticity diagram by a triangle joining the coordinates for the three colors.

Also, a typical night vision system that uses only a single sensor such as an image intensifier tube is a direct view system that means the axis of the user's eye is in optical alignment with the primary viewing axis of the image intensifier tube while the user looks at a phosphorous screen. Alternative systems using liquid crystal displays (LCD) or other electronic displays for viewing an image from a sensor are not axially aligned with the sensor generating the electronic image. For example, U.S. Pat. No. 4,786,966, issued 22 Nov. 1988, to Charles M. Hanson et al. teaches a head mounted display using a camera or sensor that is remote from the display such that the electronic display for viewing the image from a sensor is not axially aligned with the sensor generating the electronic image and the user's optical axis.

Additionally, multiple sensor units with coaxially aligned sensors are known and taught in U.S. Pat. No. 6,593,561, issued 15 Jul. 2003, to Antonio V. Bacarella et al., as an example. However, the alignment of the display and at least one of the sensors along a single optical axis is not disclosed.

U.S. Pat. No. 6,560,029, issued 5 May 2003, to Blair R. Dobbie et al., teaches a side mounted, man portable night vision goggle with an image from a thermal camera electronically fused with the images from a video camera on a display.

While the above cited references introduce and disclose a number of noteworthy advances and technological improvements within the art, none completely fulfills the specific objectives achieved by this invention.

SUMMARY OF INVENTION

In accordance with the present invention, a user portable viewing device includes a plurality of non-coaxially aligned sensors for sensing a scene to be viewed and operably attached to a processing element combining electronic images originating from at least two sensors into a single electronic image for viewing by a user. An electronic display is operably connected to the processing element for displaying the combined electronic image. One of the sensors has an input end to sense the scene to be viewed and is adaptable for mounting in an optical axis extending from an eye of the user. The electronic display is adapted to be positioned in the optical axis of the user between the eye of the user and the input end of the sensor for direct view of the display of the combined image by the user.

In a second embodiment of the present invention, a system for fusing images from a plurality of sensors into a colored image is disclosed. The system comprises two or more sensors for generating two or more sets of image data. An information processor receives and samples the sets of image data to compute and generate a fused non-monochromatic or colored image from the sample data. A display receives the fused image array and displays the fused image generated from the fused image array.

A four-step method for fusing images is disclosed. Step one calls for receiving sets of image data generated by the plurality of sensors. Step two provides for sampling each set of image data to produce two or more sets of sampled data. In step three, the method provides for generating a colorized array for each set of sampled data, which array is calculated by computing or assigning a specific color value represented by a point along a pre-selected vector in an X-Y colorspace and which color value is determined based on and corresponding to each pixel to be analyzed from the sample data based on the intensity or other factor associated with the analyzed pixel. The last step calls for displaying a fused image generated mathematically combining corresponding points from each of the colorized arrays.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

Figure 1:
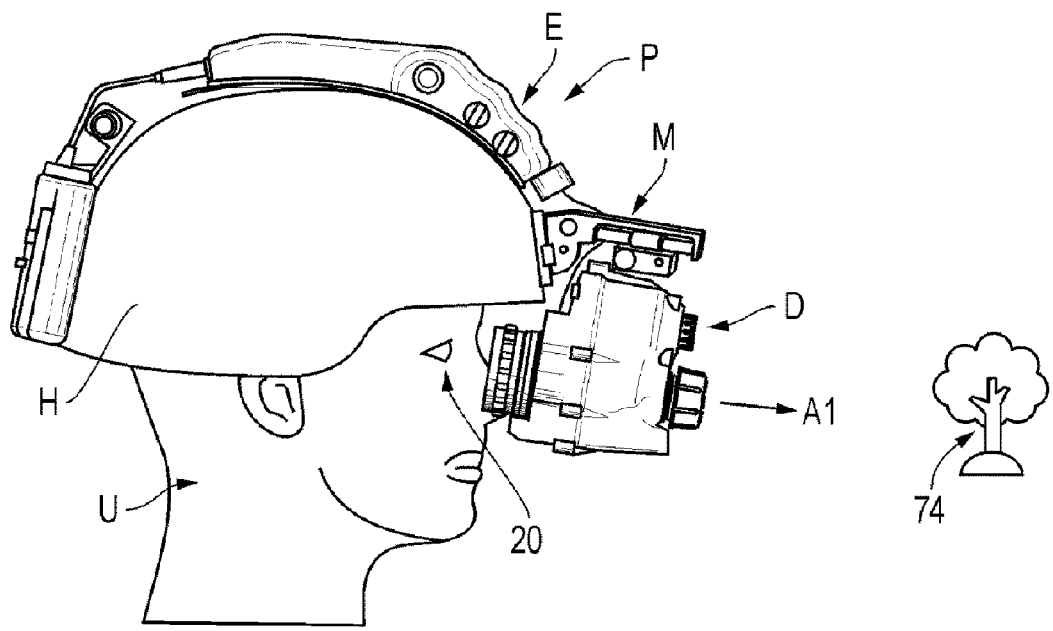
FIG. 1 is a right side elevational view of the present invention affixed to a standard ballistic type helmet.

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

This application relates to pending application Ser. No. 10/250,196, filed Jun. 11, 2003 and published as US 2003/0231 804 A1, the specification of which is incorporated by reference as if fully set forth herein.

In a first embodiment of the invention, a user portable viewing device D includes a plurality of non-coaxially aligned sensors 26 and 32 for sensing a scene 74 to be viewed and operably attached to a processing element P combining electronic images originating from at least two sensors into a single electronic image for viewing by a user U. An electronic display 24 is operably connected to the processing element P for displaying the combined electronic image. One of the sensors 26 has an input end 28 to sense the scene 74 to be viewed and is adaptable for mounting in an optical axis A1 extending from an eye 20 of the user U.

The electronic display 24 is adapted to be positioned in the optical axis A1 of the user U between the eye 20 of the user and the input end 28 of the first sensor 26 for direct view of the display 24 of the combined image by the user U.

Referring particularly to FIG. 1, an multi-sensor viewing device D is shown attached to a ballistic type helmet H worn by a user U by a helmet mount M. A separate electronics interface module E is operably connected to the multi-sensor viewing device D. Optionally, the processing element P may be mounted with the separate electronics interface module E or mounted closed to the electronic display 24 in the viewing device D.

Figure 2:
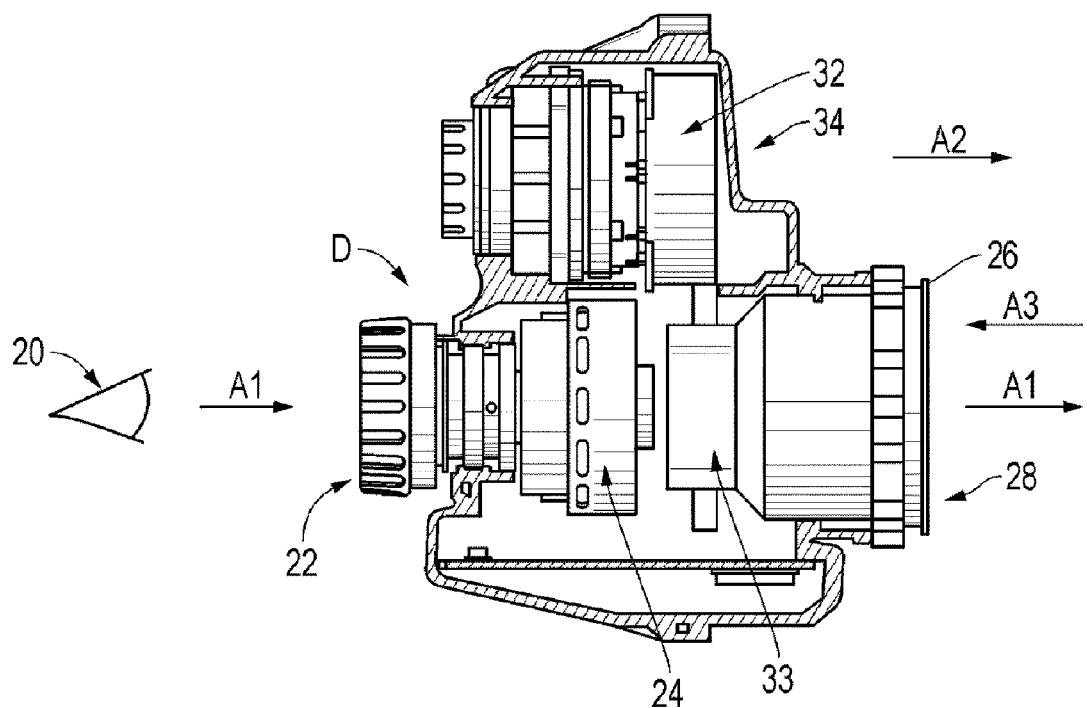
FIG. 2 is a right side elevational view of the digitally enhanced night vision ("D-ENVG") device with the housing cut-away showing the interior components.
Figure 3:
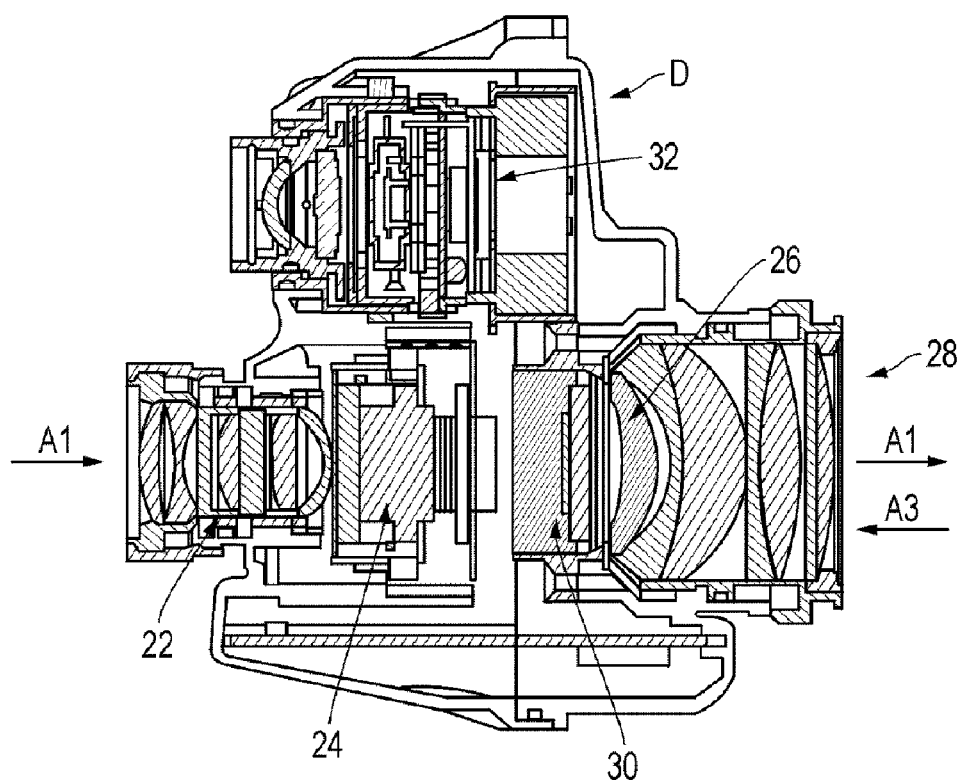
FIG. 3 is a cross sectional view of the present D-ENVG device.
Figure 4:
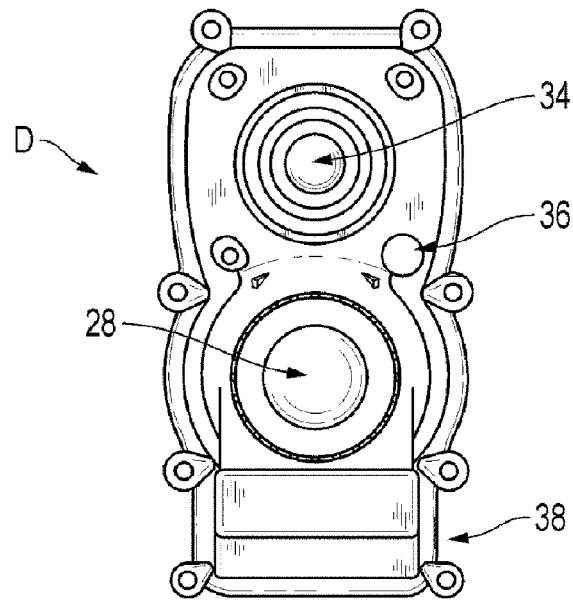
FIG. 4 is a frontal view of the present D-ENVG device.

The multi-sensor device D of the present invention is more fully shown in FIGS. 2 through 4. A first sensor 52 may be of an image intensification tube type 26 for example. Such known image intensifier tubes generate a viewable image either directly from a phosphorous screen or indirectly through a digital display 24 that is operably connected to a CMOS camera or assembly that is in turn operably connected to a processing unit P. The observer U using one of their eyes 20 views the display 24 through an optical eyepiece 22. The input end 28 of the first sensor or image intensifier tube 26 is positioned during viewing within the optical axis A1 extending from the user's eye 20 through the display 24. The alignment of the present invention acts to reduce or minimize problems of the user U due to the user U being guided by looking at the image on the display 24 that is off axis, which may be a cause of disorientation in a soldier relying mainly on the visual cues from the display 24.

The second sensor 56 generally senses the scene 74 to be observed at a different wavelength of the light spectrum, such as infrared (IR) for example. Thus, the second sensor 56 may be a known IR camera type device 32 having an input end 34 for receiving the image to be viewed or sensed.

Thus, there is a direct line of view (axis A1) from the user's eye 20 of the fused image displayed on the electronic image display 24 with an input axis A3 of the first sensor 26 providing a source of an image to be fused prior to display. The viewing axis A2 of the second sensor 32 generally is substantially parallel to the optical axis A1, but axis A1 and axis A2 are not coaxially aligned, which may cause a problem with parallel adjustments.

The multi-sensor device D may optionally include accessory assemblies such as an IR illuminator 36 to generate a sufficient source of energy at an appropriate wavelength to illuminate the target scene 74.

The first and second sensors, such as the image intensifier tube 26 and IR camera 32, are normally contained within a protective housing 38 that may also contain the display 24 and other components necessary for the operation of the device D.

Figure 5:
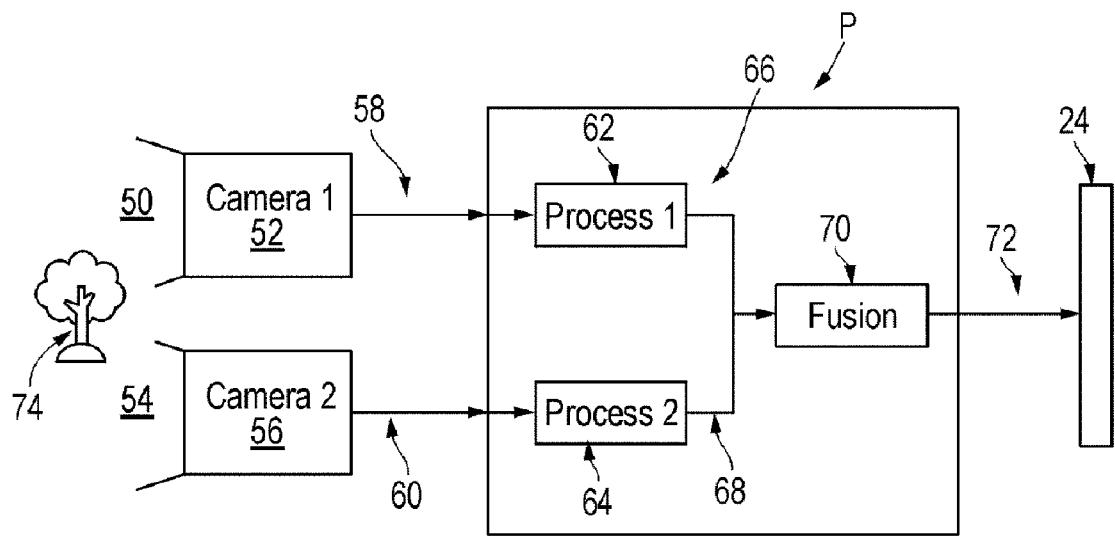
FIG. 5 is a block diagram showing the information flow through the present information to the viewing display.
Figure 6:
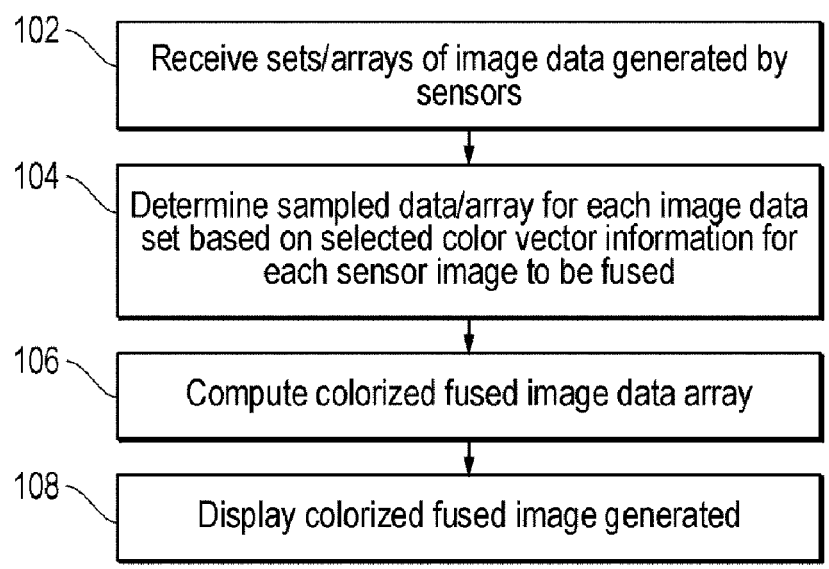
FIG. 6 is a flowchart demonstrating one method of fusing colorized images in accordance with the present invention.

In a second embodiment of the present invention and with particular reference to FIGS. 5 and 6, a system for fusing images comprises sensors 52 and 56 for generating sets of image data representative of a scene 74 to be observed.

The first sensor 52 generates a set of image data representative of the scene 74 as observed in the field of view 50 of the first sensor 52. The first set of image data from the first sensor 52 is electrically communicated through electrical path or output information signal stream 58 to a processing module P. Similarly, the second sensor 56 generates a second set of image data representative of the scene 74 as observed in the field of view 54 of the second sensor 56. The second set of image data from the second sensor 56 is electrically communicated through the second, parallel electrical path 60 to the processing module P.

The information processor module P receives and samples the multiple sets of image data originating from the first sensor 52 and the second sensor 56 to generate sample data for computing a fused image array.

Each of the two or more sets of image data generated by the two or more sensors 52 and 56 comprise or are equivalent to an array or matrix of datapoints with each datapoint in the matrix being representative of at least one information factor that is mapped to a pre-determined area of the scene as received by the corresponding sensor. For example, each datapoint in the matrix may be considered to be a pixel represented as a 2 bit, 8 bit, or other sized grouping or chunk of information that signifies a characteristic or factor sensed within the pre-determined area of the scene. If the sensor is an IR camera, the sampled factor could be heat or temperature such that the higher temperature observed by the sensor within that pre-determined area of the scene, the higher the value assigned to the corresponding datapoint in the sampled data matrix. Another possibility is that information may include a function representative of a difference in contrast between the specific pre-determined area of the scene or adjacent areas of the scene. Each set of image data should have the same pixel arrangement.

Generally, the first set of image data from the first sensor 52 is communicated through signal path 58 to a first processing unit 62. The first processing unit 62 samples the first set of image data from the first sensor 52 to produce corresponding mapped sample data array for each set of image data, if there are repeated image data sets taken, such as in a video stream. Likewise, the second set of image data from the second sensor 56 is communicated through signal path 60 to a second processing unit 64. The second processing unit 64 samples the second set of image data from the second sensor 56 to produce corresponding mapped sample data array for each set of image data, if there are repeated image data sets taken, such as in a video stream.

Each sample data array comprising a mapping of datapoints from one of the image data sets that has been mapped to a corresponding datapoint in the related sample data array using a pre-determined function; the mapping function being computed by assigning a point along a color vector in an X–Y, or multi-dimensional colorspace to a selected value of the information factor. Such multi-dimensional colorspace may be similar to that known as the RGB (Red-Green-Blue) colorspace (for media that transmit light), or as that advanced by the International Commission on Illumination ("CIE") in 1931 and also known as the CIE 1931 color space. In essence the CIE colorspace is a two dimensional representation wherein the x axis and the y axis are related to the three tristimulus values (X, Y, and Z) according to $x=X/(X+Y+Z)$, and $y=Y/(X+Y+Z)$. (Mathematically, x and y are projective coordinates and the colors of the chromaticity diagram occupies a region of the real projection plane.) Alternatively, the colorspace may be represented by the origin (point 0,0) being black and the x axis intensities of red and the y axis intensities of green, for example.

Optionally, the user may have a control to select or choose one or more vectors or rays through colorspace to be mapped to a specific sensor's output. Such an alternative would produce a substantial number of color variations in the fused image that may be better suited for the user's task.

A fusion module 70 is electrically connected to the first processor 62 by output path 66 and is also electrically connected to the second processor 64 by output path 68. The fusion processing module 70 combines the two or more sets of sampled colorized data sets or matrices and computes a fused colorized image array to be displayed from the sets of mapped sample data arrays.

A fused colorized image array may be computed from the sample data arrays by combining corresponding datapoints from each of the sample data arrays using a pre-selected arithmetic vector function. Examples of such final fusion combination schemes may be: (1) simple, linear mathematical addition of the values from the first sensor and the second sensor; (2) a weighted addition; (3) a non-linear combination, such as a quadratic equation or a Taylor function; or (4) the sum of scalar multiples of each value from the first sensor and the second sensor. The important consideration is that each spectral channel's identity be maintained for the final image discrimination and that no information be lost from the choice of color vectors or method of combining the corresponding datapoints from each of the two sensors.

Alternatively, the fused colorized image array can be computed from the sample data arrays using a class of one or more image fusion algorithms that performs an addition or subtraction process or similar desired functions.

Ultimately, the fused output stream 72 is communicated to an electrical display 24 that receives the fused image array and displays a fused colorized image generated from the fused image array.

The first and second sensors, such as the image intensifier tube 26 and IR camera 32, may generate an analog or digital output signal as desired. Similarly, the input signals conveyed over the signal paths 58 and 60 to the processor P can be analog or digital.

FIG. 6 is a flowchart demonstrating one method of image fusion in accordance with the present invention. The following steps may be performed automatically using an information processor P. The method begins with step 102, where two or more image sensors generate two or more sets of image data. As above, suppose that there are two image sensors, each with the same pixel arrangement and each set of image data comprise an array of datapoints with each datapoint being representative of at least one information factor mapped to a pre-determined area of the scene as received by the sensor.

The method then proceeds to step 104 where the sets of image data are sampled to produce corresponding mapped sample data arrays for each set of image data and for use in computing a fused colorized image array to be displayed from the sample data. Each sample data array comprises a mapping of datapoints from an image data set mapped to a corresponding datapoint in the related sample data array using a pre-determined function as described above. The mapping function is computed by assigning a point along a color vector in a multi dimensional colorspace to a selected value of the information factor.

Referring again to FIG. 6, in steps 106 and 108, a fused colorized image array is computed from the sample data arrays. In step 106, a colorized image fusion array or matrix is calculated from the sample data sets. The values of the colorized image fusion array may be assigned as solutions to linear or non-linear combinations or functions of the sample data to resulting pixel values that are subsequently conveyed to the display. These values, for example, may give the relative weight of the data from each sensor, such that the data from the sensor that produces the better image is given more weight. Or, these values may be used to provide a control for the production of, for example, a color image more appropriate for threat assessment by a soldier.

Finally in step 108 a fused colorized image generated from the fused colorized image array is displayed for the user U.

Also as an optional feature, the processor unit P, the electronic interface module E or the image fusion device D can be networked or interoperably connected with other compatible devices or networks to exchange image transmission or other information through local area type networks or larger tactical networks using known techniques.

The foregoing disclosure and description of the invention are illustrative and explanatory thereof, and various changes in the size, shape and materials, as well as in the details of the illustrated construction may be made without departing from the spirit of the invention.

What is claimed is:

1. A system for fusing images of a scene received by a plurality of sensors into a displayable colorized image, the system comprising:

two or more sensors for generating two or more corresponding sets of image data; each set of image data comprising an array of datapoints with each datapoint being representative of at least one information factor mapped to a pre-determined area of the scene as received by the sensor;

an information processor for receiving and sampling the sets of image data to generate corresponding mapped sample data arrays for each set of image data and for computing a fused colorized image array to be displayed from the sample data;

each sample data array comprising a mapping of datapoints from an image data set mapped to a corresponding datapoint in the related sample data array using a pre-determined function;

the mapping function being computed by assigning a point along a color vector in a two or more dimensional colorspace to a selected value of the information factor; and a fused colorized image to be displayed being computed from combining corresponding datapoints from each of the information factored mapped sample data arrays using a pre-selected arithmetic vector function; and a display for receiving the fused colorized image array and displaying the fused colorized image generated from the fused colorized image array.

2. The system of claim 1 wherein the plurality of sensors include an image intensifier tube and an infrared camera.

3. The system of claim 1 wherein the combining function to compute the fused colorized image is addition.

4. The system of claim 1 wherein the combining function to compute the fused colorized image is a linear combination.

5. The system of claim 1 wherein the combining function to compute the fused colorized image is a non-linear combination.

6. The system of claim 1 wherein the vector chosen in the multi-dimensional colorspace is a selected vector formed in a CIE 1931 colorspace.

7. The system of claim 1 wherein the combining function to compute the fused colorized image is a class of image fusion algorithms that perform additive or subtractive functions.

8. The system of claim 1 wherein the display for displaying a fused colorized image generated from the fused colorized image array and the plurality of sensors are mounted within a housing.

9. A method for fusing images, the method comprising the steps of:

receiving two or more sets of image data generated by two or more sensors; each set of image data comprising an array of datapoints with each datapoint being representative of at least one information factor mapped to a pre-determined area of the scene as received by the sensor;

sampling the sets of image data to produce corresponding information factored mapped sample data arrays for each set of image data and for use in computing a fused colorized image array to be displayed from the mapped sample data; each sample data array comprising a mapping of datapoints from an image data set mapped to a corresponding datapoint in the related sample data array using a pre-determined function; the mapping function being computed by assigning a point along a color vector in a two or more dimensional colorspace to a selected value of the information factor;

computing a fused colorized image array from the sample data arrays by combining corresponding datapoints from each of the sample data arrays using a pre-selected arithmetic vector function; and displaying a fused colorized image generated from the fused colorized image array.

10. The method of claim 9 wherein the plurality of sensors include an image intensifier tube and an infrared camera.

11. The method of claim 10 wherein the vector chosen in the multi-dimensional colorspace is a selected vector formed in a CIE 1931 colorspace.

12. The method of claim 9 wherein a display for displaying a fused colorized image and a plurality of sensors for generating the set(s) of image data are mounted within a housing.

* * * * *